(12) United States Patent
Copeland

(10) Patent No.: US 10,288,199 B2
(45) Date of Patent: May 14, 2019

(54) RESTRAINED PLASTIC PIPE JOINT AND METHOD OF MAKING SAME

(71) Applicant: McWane, Inc., Birmingham, AL (US)

(72) Inventor: Daniel A. Copeland, Bessemer, AL (US)

(73) Assignee: McWane, Inc., Birmingham, AL (US)

( * ) Notice: Subject to any disclaimer, the term of this patent is extended or adjusted under 35 U.S.C. 154(b) by 416 days.

(21) Appl. No.: 15/151,932

(22) Filed: May 11, 2016

(65) Prior Publication Data

US 2017/0328503 A1   Nov. 16, 2017

(51) Int. Cl.

| | |
|---|---|
| *F16L 21/03* | (2006.01) |
| *F16L 37/08* | (2006.01) |
| *F16L 47/08* | (2006.01) |
| *F16L 21/02* | (2006.01) |
| *F16L 17/035* | (2006.01) |
| *F16L 37/084* | (2006.01) |

(52) U.S. Cl.
CPC .............. *F16L 21/03* (2013.01); *F16L 17/035* (2013.01); *F16L 21/022* (2013.01); *F16L 37/08* (2013.01); *F16L 37/0845* (2013.01); *F16L 47/08* (2013.01)

(58) Field of Classification Search
CPC ................................ F16L 21/03; F16L 21/007
USPC .................................. 285/339, 341, 342, 343
See application file for complete search history.

(56) References Cited

U.S. PATENT DOCUMENTS

| | | | | |
|---|---|---|---|---|
| 4,030,872 A | * | 6/1977 | Parmann ................. | F16L 47/08 425/393 |
| 5,213,339 A | * | 5/1993 | Walworth ............... | F16L 21/03 277/314 |
| 5,295,697 A | * | 3/1994 | Weber ................. | F16L 37/0845 277/616 |
| 5,464,228 A | * | 11/1995 | Weber ................. | F16L 37/0845 277/615 |
| 5,988,695 A | * | 11/1999 | Corbett, Jr. ............. | F16L 21/03 264/249 |
| 6,105,972 A | * | 8/2000 | Guzowski ............... | F16L 21/03 277/604 |
| 6,688,652 B2 | | 2/2004 | Holmes, IV et al. | |
| 7,284,310 B2 | | 10/2007 | Jones et al. | |
| 7,401,791 B2 | | 7/2008 | Andrick et al. | |
| 7,461,868 B2 | * | 12/2008 | Allen ................... | F16L 37/0845 285/104 |
| 7,537,248 B2 | * | 5/2009 | Jones ..................... | F16L 47/08 285/104 |
| 7,774,915 B2 | * | 8/2010 | Darce ..................... | F16L 21/03 277/609 |

(Continued)

*Primary Examiner* — David Bochna

(74) *Attorney, Agent, or Firm* — C. Brandon Browning; Maynard, Cooper & Gale, PC

(57) ABSTRACT

A gasket for preventing the separation of a pipe joint formed between plastic pipes such as pipes manufactured from PVC. The invention provides a restrained pipe joint including a first pipe including a bell with a spigot entryway and a substantially V-shaped annular groove. The annular groove includes a front radial wall and a rear radial wall and a gasket seated in the annular groove. The gasket includes an inner radial face, an opening defined by the inner radial face and an outer radial face with a front radial section located adjacent to the front radial wall of the annular groove and a rear radial section located adjacent to the rear radial wall of the annular groove. A plurality of restraining segments is at least partially embedded in the gasket.

20 Claims, 3 Drawing Sheets

(56) References Cited

U.S. PATENT DOCUMENTS

| | | |
|---|---|---|
| 7,784,798 B2 | 8/2010 | Walworth et al. |
| 7,815,225 B2 | 10/2010 | Jones et al. |
| 7,845,686 B2 | 12/2010 | Steinbruck |
| 8,096,585 B2 * | 1/2012 | Vitel ................. F16L 21/08 |
| | | 285/110 |
| 8,235,427 B2 | 8/2012 | Jones et al. |
| 8,444,186 B2 * | 5/2013 | Jones ............. F16L 37/0925 |
| | | 285/113 |
| 8,490,273 B1 | 7/2013 | Copeland et al. |
| 8,511,690 B2 | 8/2013 | Holmes, IV et al. |
| 8,511,691 B2 | 8/2013 | Holmes, IV et al. |
| 8,533,926 B2 | 9/2013 | Holmes, IV et al. |
| 8,544,851 B2 | 10/2013 | Holmes, IV et al. |
| 8,857,861 B2 * | 10/2014 | German ........... F16L 37/0845 |
| | | 285/105 |
| 8,870,188 B2 | 10/2014 | Holmes, IV et al. |
| 9,057,467 B2 | 6/2015 | Copeland et al. |
| 9,400,071 B1 * | 7/2016 | Copeland ............. F16L 21/03 |
| 9,400,073 B2 | 7/2016 | Lopez-Chaves |
| 9,593,787 B2 | 3/2017 | Monteil et al. |
| 2006/0119100 A1 * | 6/2006 | Jones ................. F16L 37/0925 |
| | | 285/374 |
| 2008/0018104 A1 | 1/2008 | Walworth et al. |
| 2009/0060635 A1 * | 3/2009 | Jones ................. F16L 37/0925 |
| | | 403/14 |
| 2010/0078937 A1 * | 4/2010 | Jones ..................... F16L 21/03 |
| | | 285/345 |
| 2010/0225111 A1 | 9/2010 | Owen |
| 2012/0025471 A1 | 2/2012 | Andrick et al. |
| 2013/0043656 A1 | 2/2013 | Copeland et al. |
| 2013/0113208 A1 * | 5/2013 | Liao ................. F16L 37/0925 |
| | | 285/339 |
| 2014/0339773 A1 | 11/2014 | Holmes, IV et al. |
| 2014/0374994 A1 * | 12/2014 | Monteil ................. F16L 21/03 |
| | | 277/314 |
| 2014/0374995 A1 * | 12/2014 | Monteil ................. F16L 21/03 |
| | | 277/314 |
| 2015/0204468 A1 | 7/2015 | Jones |
| 2016/0245436 A1 | 8/2016 | Monteil |
| 2017/0370505 A1 * | 12/2017 | Copeland ............. F16L 21/007 |

* cited by examiner

RESTRAINED PLASTIC PIPE JOINT AND METHOD OF MAKING SAME

FIELD OF THE INVENTION

The present invention is directed to a restrained pipe joint and method of making same and, more particularly, to a pipe joint including a gasket containing locking segments configured for preventing the separation telescoping plastic pipes during fluid pressurization.

BACKGROUND OF THE INVENTION

Pipe joint gaskets including anti-slip segments for preventing the separation of interconnected, telescoping metal pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced around its inner perimeter. The toothed metal segments bite into the outer surface of the spigot of the inserted pipe and prevent withdrawal of the inserted pipe from a bell end of the other pipe. A shortcoming of such gaskets is that during fluid pressurization of the interconnected pipes, excessive axial thrust force generated by the resulting hydrostatic pressure can cause the metal segments to exert destructive radial loads upon the inner axial surface of the bell end and the outer axial surface of the spigot end. In many instances, these radial loads are great enough to fracture the spigot and bell ends of the metal pipes.

Since anti-slip segments are known to destructively impinge upon metal pipes, the use of gaskets containing such or similar segments for preventing the separation of interconnected plastic pipes has been limited, especially in high pressure applications. Instead, plastic pipes, such as those formed from thermoplastic materials including polyethylene, polybutylene, polypropylene and poly(vinyl chloride) or PVC, are joined together by means of a bell-and-spigot gasket-sealed joint utilizing gaskets referred to as Reiber gaskets.

A Reiber gasket consists of a continuous steel band either externally or internally bonded to an elastomer annular body. The Reiber gasket is locked into place within an annular groove of the bell and functions to prevent the gasket from becoming dislodged therefrom. The Reiber gasket fails however to sufficiently restrain axial separation of plastic pipes along a joint upon fluid pressurization of the pipe at high pressure. Accordingly, there is a need for a gasket that is capable of forming a seal between plastic pipes, while preventing separation of the pipes at high pressure.

SUMMARY OF THE INVENTION

The present invention is directed to a gasket for preventing the separation of a pipe joint formed between plastic pipes such as pipes manufactured from PVC. The invention is based upon the discovery that gaskets containing metal locking segments can form seals between joined plastic pipes and prevent separation of the pipes upon pressurization without the metal segments destructively impinging upon the pipes. According to one aspect of the invention there is provided a restrained pipe joint including a first pipe including a bell with a spigot entryway and a substantially V-shaped annular groove. The annular groove includes a front radial wall and a rear radial wall and a gasket seated in the annular groove. The gasket includes an inner radial face, an opening defined by the inner radial face and an outer radial face with a front radial section located adjacent to the front radial wall of the annular groove and a rear radial section located adjacent to the rear radial wall of the annular groove. The gasket also includes a sealing portion having an indentation formed between a pair of arms extending away from the spigot entryway of the first pipe.

A plurality of restraining segments is at least partially embedded in the gasket. Each restraining segment includes an inner wall having a first tooth extending towards the opening in the gasket, an outer wall having a second tooth extending towards the front radial wall of the annular groove and a nose portion formed by an intersection of the inner wall and the outer wall. The nose extends towards the spigot entryway and into a space defined between the spigot and the front radial wall of the annular groove, a tip of the nose being located forward of the first tooth and the second tooth. The first tooth and the second tooth are arranged to impinge upon the spigot and the front radial wall of the annular groove, respectively, upon pressurization of the pipe joint. This occurs without the nose impinging upon the annular groove or the spigot.

According to another aspect of the invention there is provided a method of forming a restrained pipe joint. The method includes providing a first plastic pipe having a bell with an annular groove, the annular groove including a gasket, a front radial wall and a rear radial wall, inserting a spigot of second plastic pipe into the bell and through an opening of the gasket, impinging a first tooth of a restraining segment against the spigot and a second tooth of the restraining segment against the front radial wall and wedging a nose portion of the restraining segment between the bell and the spigot.

According to yet another aspect of the invention, there is provided a plastic pipe including a bell including an annular groove with a front radial wall and a rear radial wall. A gasket is seated in the annular groove, the gasket including an inner radial wall defining an opening through the gasket and an outer radial wall. One or more restraining segments are at least partially embedded in the gasket, each restraining segment including an inner face from which a first row of teeth extends towards the opening of the gasket and outer face from which a second row of teeth extends towards the front radial wall of the bell. The inner wall and the outer wall of the restraining segment define respective planes that intersect one another at an angle of about 40° to about 50° to form a rounded nose, the inner wall, the nose and the outer wall forming an essentially V-shaped cross-section.

DETAILED DESCRIPTION OF THE INVENTION

Figure 1:
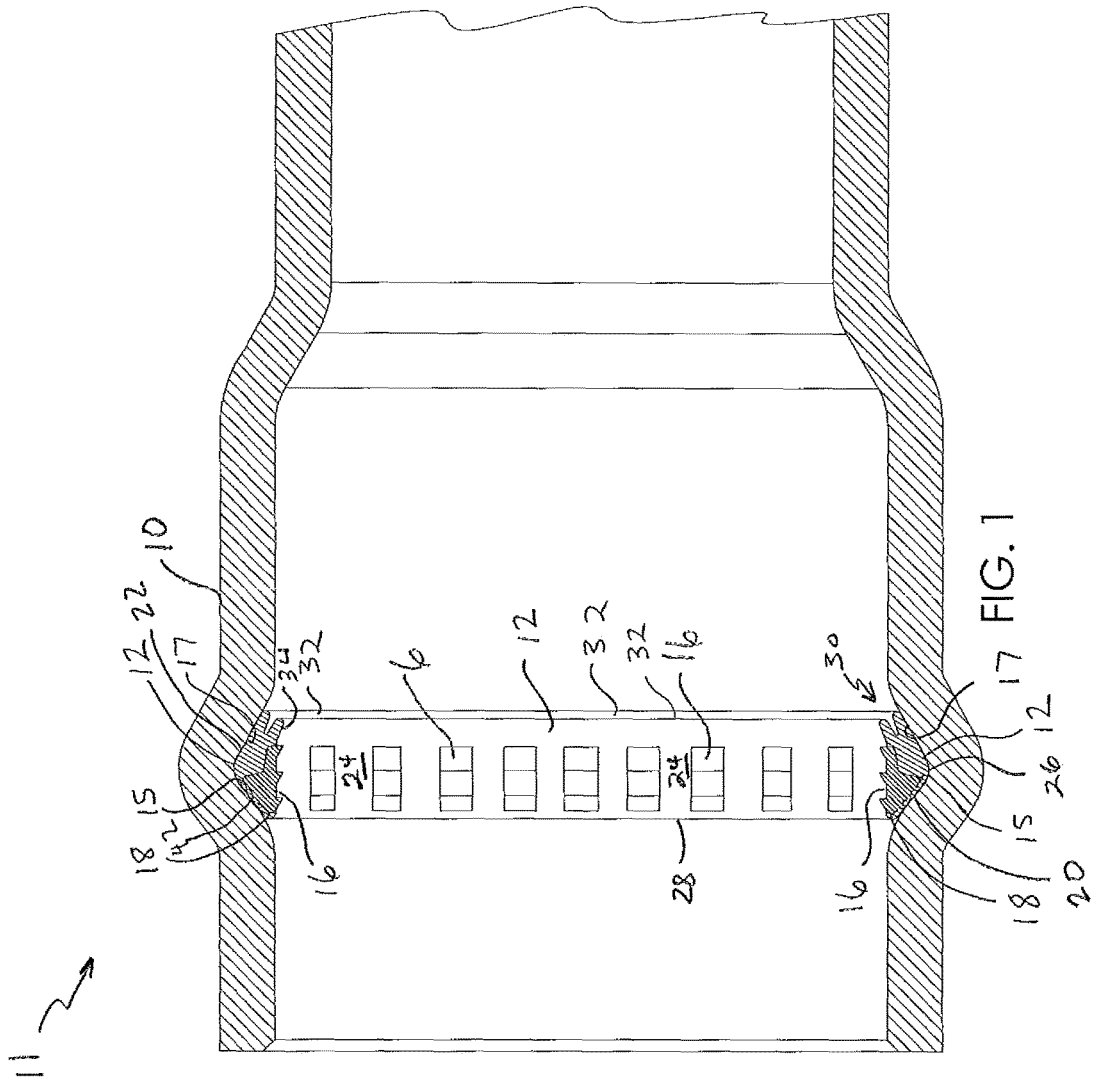
FIG. 1 is a sectional view of a bell end of a pipe containing a gasket in accordance with a preferred embodiment of the present invention.

The present invention is directed to a restrained pipe joint formed between plastic pipes. Generally, the pipe joint includes a bell end 10 of a first plastic pipe 11, a gasket 12 seated within bell end 10 and a spigot end 14 of a second plastic pipe 13 inserted through gasket 12, gasket 12 forming a seal between pipes 11 and 13. Locking segments 16 are embedded within and circumferentially arranged around gasket 12. Locking segments 16 are arranged to impinge upon pipes 11 and 13 upon pressurization of the pipe joint thereby restraining axial movement of spigot end 14 out of bell end 10. To prevent over-impingement of locking segments 16 into pipes 11 and 13 and further resist axial separation of the pipes, locking segments 16 each include a rounded nose portion 18 that, upon pipe pressurization of the pipes, functions as a wedge between pipes 11 and 13. The foregoing is accomplished without the use of a joint gasket gland or a Reiber gasket.

More particularly, as illustrated in FIG. 1, the inner surface of bell end 10 includes an annular retainer groove defined by a front radial wall 15 and a rear radial wall 17 which intersect to provide the retainer groove with a substantially V-shaped cross-section. The annular groove of bell end 10 can be formed by extruding first plastic pipe 13 over a mandrel having a Reiber gasket disposed thereon and removing the first plastic pipe from the mandrel with the Reiber gasket located in the annular groove, for example, as described in U.S. application Ser. No. 14/817,923, the entire contents of which are incorporated herein by reference. Thereafter, the Reiber gasket is removed and replaced with gasket 12. Gasket 12 is positioned within the retainer groove with a front outer face 20 thereof being arranged adjacent to and, in sealing engagement with, front radial wall 15 and a rear outer face 22 thereof being arranged adjacent to and, in sealing engagement with, rear radial wall 17. Thus, it is contemplated that the gasket of the present invention can be used to retrofit existing plastic pipe bells which contain Reiber gaskets.

Gasket 12 is composed of an annular rubber body having a generally triangular cross-section defined by front outer face 20, rear outer face 22 and an inner face 24. As depicted in FIGS. 1 through 4, the intersections of faces 20, 22 and 24 form three corners including a first corner 26 formed by the intersection of front outer face 20 and rear outer face 22, a second corner 28 formed by the intersection of front outer face 20 and inner face 24 and a third corner portion 30 formed by the intersection of rear outer face 22 and inner face 24. For reasons described hereafter, third corner portion 30 includes an indentation 32 that divides rear third portion 30 into a pair of opposing, slightly flared arms 34 which extend proximally and form a substantially V-shaped space or gap therebetween.

Figure 2:
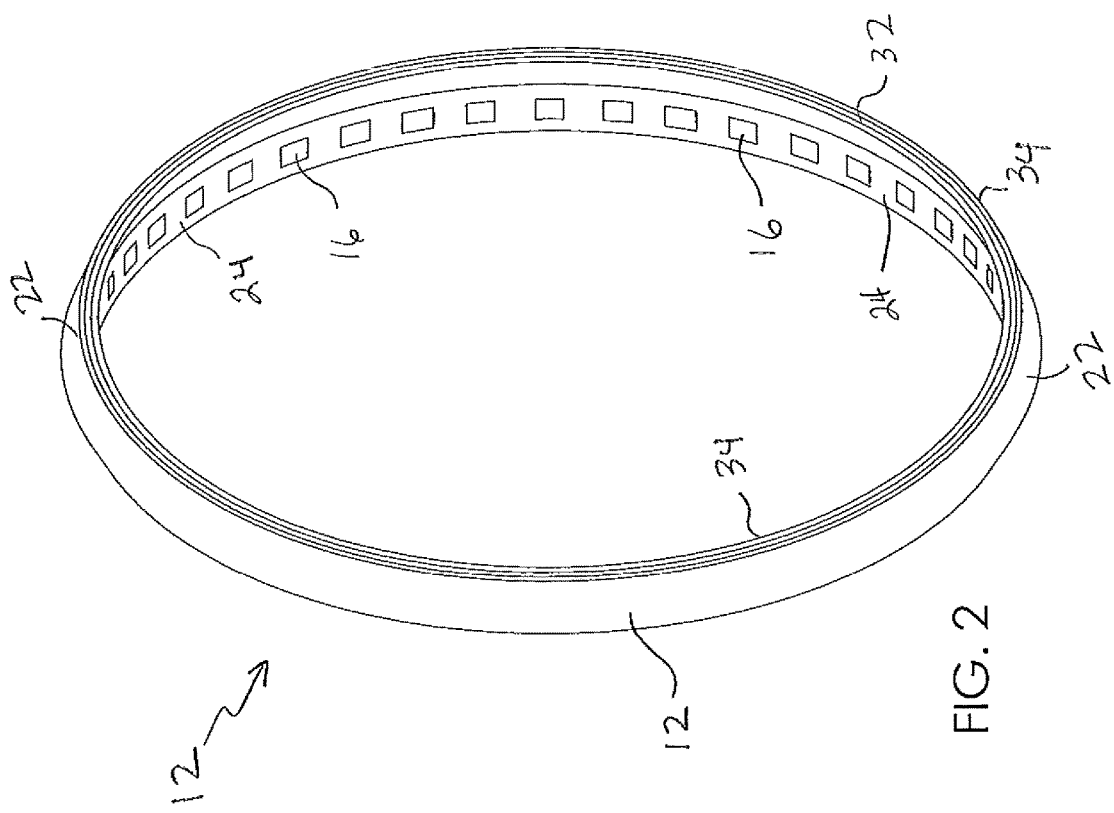
FIG. 2 is a perspective view of the gasket of FIG. 1 showing the placement of restraining segments around its periphery.

Inserted into gasket 12 are locking segments 16. As depicted in FIG. 2, segments 16 are spaced apart equally in a circumferential direction around the periphery of gasket 12 and firmly vulcanized into radial grooves found within gasket 12. The number of locking segments 16 inserted into gasket 12 varies depending upon the anticipated fluid pressure at the pipe joint and the size of the pipes involved.

Figure 3:
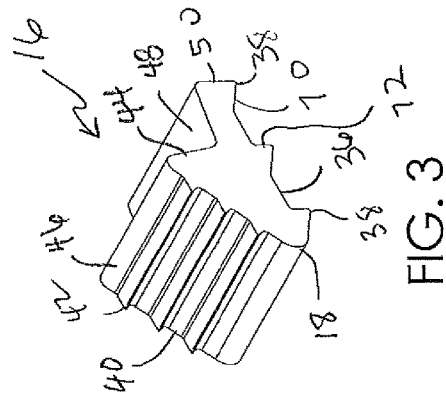
FIG. 3 is a front perspective view of one of the restraining segments of FIG. 2.
Figure 4:
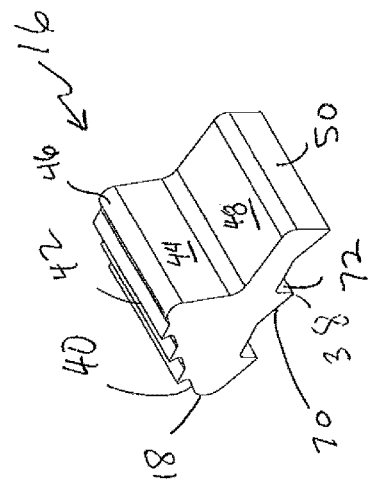
FIG. 4 is a rear perceptive view of the restraining segment of FIG. 3.

Referring to FIGS. 3 and 4, each segment 18 includes a substantially flat, inner surface 36 having three rows of acutely pointed, planar-arranged teeth 38 extending radially inward therefrom. Inner surface 16, which is preferably embedded within the rubber body of gasket 12, extends adjacent to and along inner face 24 of gasket 12 with teeth 37 protruding slightly through inner surface 36. Each segment 16 further includes a substantially flat front outer surface 40 that intersects inner surface 36 at nose portion 18. Front outer surface 40 extends adjacent to and along front outer face 20 of gasket 12 with nose portion 18 being positioned adjacent to second corner 28. Three rows of acutely pointed teeth 42 extend radially outward from front outer surface 40. Teeth 42 remain completely embedded within the rubber body of gasket 12, at least until pressurization of pipes 11 and 13. In addition to inner surface 36 and front outer surface 40, each segment 16 includes a substantially L-shaped rear outer surface defined by a vertical surface 44, which intersects front outer surface 40 to form a first edge 46 positioned adjacent to first corner 26 of gasket 12, and a horizontal surface 48, which extends proximally from vertical surface 44 and parallel to inner surface 36. Horizontal surface 48 intersects a distal-most surface 50 of segment 16, which forms a portion of the distal-most row of teeth 38. L-shaped surface is configured to maximize the mass and thickness of the proximal-most half of the rubber body of gasket 12 for improving the sealing performance of gasket 12.

Figure 5:
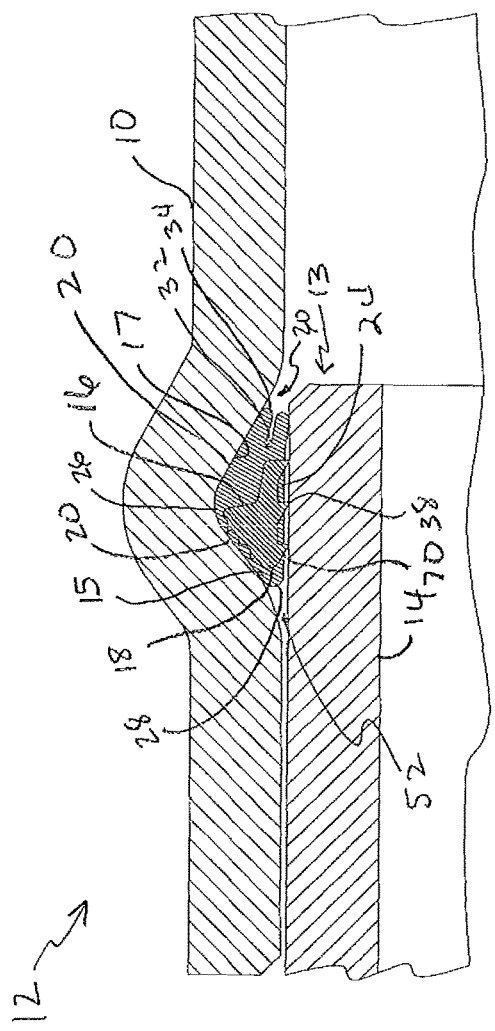
FIG. 5 is a fragmented cross-sectional view of the bell end and the gasket of FIG. 1 illustrating insertion of a spigot through the gasket.

Referring to FIG. 5, the pipe joint of the present invention is assembled by inserting spigot end 14 through an opening defined by inner surface 24 of gasket 12. A throat of bell end 10 guides spigot end 14 into bell end 10 until a beveled end of spigot end 14 contacts a distal-most row of teeth 38. As spigot end 14 continues to slide through gasket 12, spigot end 14 presses teeth 38 radially outwardly thereby causing segments 16 to move radially outwardly thereby compressing the rubber body of gasket 14 between spigot end 14 and front radial wall 15 and a rear radial wall 17 of the retainer groove. This functions to prevent gasket 12 from dislodging from the retainer groove during further insertion of spigot end 14 into bell end 10, as well as form a seal between pipes 11 and 13. Since teeth include a tapered distal-edge 70, spigot end 14 slides across teeth 38 without the teeth impinging upon pipe 13, despite the compression of the rubber body of gasket 12. As spigot end 14 moves proximally, it contacts the innermost arm of arms 34 and causes the arm to pivot radially outward thereby decreasing space 32 defined between arms 34. By including space 32 in third corner portion 30, the innermost arm is more easily pivoted out of the way of pipe 13 as it moves proximally than if the space were absent. Thus, space 32 functions to lessen the force required to insert spigot end 14 into bell end 10.

Figure 6:
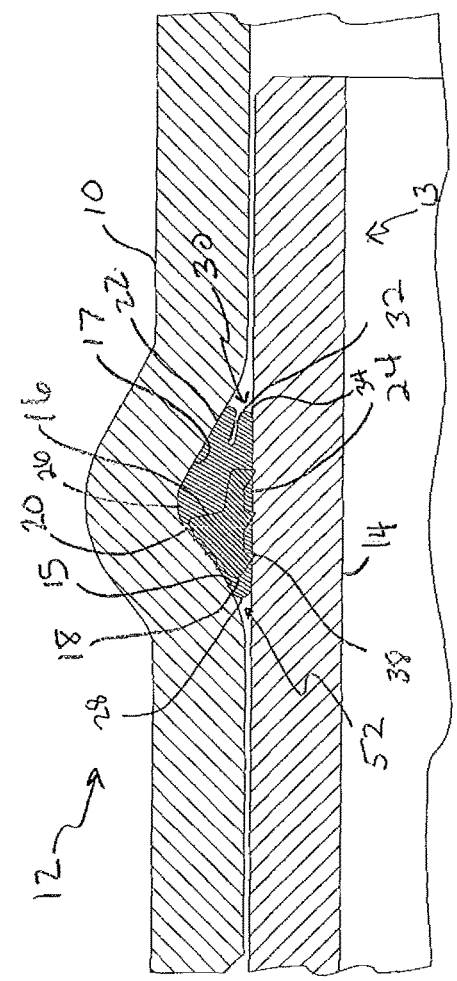
FIG. 6 is a fragmented cross-sectional view of the bell end, the gasket and the spigot end of FIG. 5 illustrating the arrangement of the restraining segment following pressurization of the interconnected pipes.

Referring to FIG. 6, upon pressurization of the pipe joint, spigot end 14 moves distally as the axial forces created by fluid pressurization force pipes 11 and 13 apart. This causes teeth 38 of each segment 16 to engage with spigot end 14 by friction or by penetrating into spigot end 14 a short distance. Teeth 38 impinge upon spigot end 14, as pipe 13 moves distally, since the proximal edge 72 of teeth 38 contacts pipe 13 at about a 90° angle. As pressure within the pipe joint is increased to normal operating pressures, segments 16 translate distally with pipe 13 towards front radial wall 15 causing teeth 42 to press through the rubber body and impinge upon front radial wall 15 of the retainer groove. Simultaneously therewith, nose portion 18 of each segment 16 advances into an annular space 52 defined between spigot end 14 and front radial wall 15 but without a distal-most tip of nose 18 impinging upon or contacting either front radial wall 15 or spigot end 14. Further advancement of segments 16 distally is arrested by the engagement of teeth 42 with front radial wall 15 and engagement of nose 18 with portions of front radial wall 15 and spigot end 14 that defined space 52 prior to pressurization. In this manner, segments 16 become wedged between bell end 10 and spigot end 14 and the axial forces generated by the pressurization of the pipes are transmitted axially between rows of teeth 38 and rows of teeth 42 and radially through nose portion 18 to and between the pipes as segments 16 is urged distally into space 52. Further, by impinging teeth 42 into front radial wall 15, radial forces caused by the wedging of segments 16 between pipes 11 and 13 are countered.

As a consequence of pressurization of the pipe joint and translation of segments 16 and gasket 12 distally, the proximal sealing portion of the rubber body of gasket 12, which is formed in part by third corner portion 30, is moved from a section of the annular retainer groove having a smaller volume to a larger volume. This occurs because the distance between rear radial wall 17 of the annular groove and spigot end 13 increases gradually moving distally. Despite the distal movement of third corner portion 30 of gasket 12 from a smaller volume to a larger volume section of the annular groove, which causes some decompression of the third corner portion, the sealing engagement between pipes 11 and 13 along the third corner portion is maintained since arms 34, being biases outwardly, press against rear radial wall 17 and spigot end 13 by virtue of the flared configuration of the arms.

As will be apparent to one skilled in the art, various modifications can be made within the scope of the aforesaid description. Such modifications being within the ability of one skilled in the art form a part of the present invention and are embraced by the claims below.

The invention claimed is:

1. A restrained pipe joint comprising:
a first pipe including a bell with a spigot entryway and an annular groove, the annular groove including a front radial wall and a rear radial wall,
a gasket seated in the annular groove, the gasket including an inner radial face, an opening defined by the inner radial face and an outer radial face with a front radial section located adjacent to the front radial wall of the annular groove and a rear radial section located adjacent to the rear radial wall of the annular groove, and
a restraining segment at least partially embedded in the gasket, the restraining segment including an inner wall having a first tooth extending towards the opening in the gasket, an outer wall having a second tooth extending towards the front radial wall of the annular groove and a nose portion formed by an intersection of the inner wall and the outer wall,
wherein the gasket includes a sealing portion having an indentation formed between a pair of arms extending away from the spigot entryway of the first pipe, and
wherein, when a spigot of a second pipe is seated within the bell, the pair of arms are pressed together between the annular groove and the spigot.

2. The pipe joint of claim 1 comprising at least two teeth extending from the outer wall towards the front radial wall of the annular groove.

3. The pipe joint of claim 1 wherein, when the spigot of the second pipe is seated within the bell, the first tooth impinges upon the spigot, and the second tooth impinges upon the front radial wall of the annular groove.

4. The pipe joint of claim 1 wherein, when the spigot of the second pipe is seated within the bell, the nose extends towards the entryway and into a space defined between the spigot and the front radial wall of the annular groove, a tip of the nose being located forward of the first tooth and the second tooth.

5. The pipe joint of claim 4 wherein the tip of the nose is not impinged upon the front radial wall of the annular groove or the spigot of the second pipe.

6. The pipe joint of claim 1 wherein the annular groove is essentially V-shaped.

7. The pipe joint of claim 1 wherein the first pipe and the second pipe are plastic.

8. A method of forming the pipe joint of claim 1 comprising, prior to the gasket being seated in the annular groove, removing a Rieber gasket from the annular groove.

9. A method of forming the pipe joint of claim 1 including inserting the spigot of the second pipe into the bell of the first pipe and the opening of the gasket, wherein following pressurization of the pipe joint, the first tooth impinges upon the spigot, the second tooth impinges upon the front radial wall of the annular groove and the nose does not impinge upon the annular groove or the spigot.

10. A method of forming a restrained pipe joint comprising:
providing a first plastic pipe having a bell with an annular groove, the annular groove including a gasket, a front radial wall and a rear radial wall,
inserting a spigot of a second plastic pipe into the bell and through an opening of the gasket,
impinging a first tooth of a restraining segment against the spigot, wherein the restraining segment is at least partially embedded in the gasket,
forming the annular groove of the bell by extruding the first plastic pipe over a mandrel having a Rieber gasket disposed thereon and removing the first plastic pipe from the mandrel with the Rieber gasket located in the annular groove, and
replacing the Rieber gasket located in the annular groove with the gasket.

11. The method of claim 10 comprising impinging a second tooth of the restraining segment against the front radial wall.

12. The method of claim 11 wherein, when the restraining segment includes an inner wall from which the first tooth extends towards the opening of the gasket, an outer wall from which the second tooth extends towards the front radial wall of the annular groove and a nose portion formed by an intersection of the inner wall and the outer wall, simultaneously impinging the first tooth against the spigot and the second tooth against the front radial wall without a tip of the nose portion impinging upon the first pipe or the second pipe.

13. A plastic pipe comprising:
a bell including an annular groove with a front radial wall and a rear radial wall,
a gasket seated in the annular groove, the gasket including an inner radial wall defining an opening through the gasket and an outer radial wall, and
a restraining segment at least partially embedded in the gasket, the restraining segment including an inner face from which a first row of teeth extend towards the opening of the gasket, and outer face from which a second row of teeth extend towards the front radial wall of the bell,
wherein the gasket includes a sealing portion having two spaced-apart arms connected by a groove, and
wherein, when a spigot of a second pipe is seated within the bell, the two spaced-apart arms are pressed together between the annular groove and the spigot.

14. The plastic pipe of claim 13 wherein the annular cavity has an essentially triangular cross-section.

15. The plastic pipe of claim 13 wherein the inner wall and the outer wall of the restraining segment define respective planes that intersect one another at an angle of about 40° to about 50°.

16. The plastic pipe of claim 13 wherein the inner wall and the outer wall of the restraining segment intersect to form a rounded nose, the inner wall, the nose and the outer wall having an essentially V-shaped cross-section.

17. A method of forming a restrained pipe joint comprising:
providing a first plastic pipe having a bell with an annular groove, the annular groove including an unrestrained gasket, a front radial wall and a rear radial wall, and
replacing the unrestrained gasket with a restrained gasket containing a restraining segment at least partially embedded therein, the restraining segment including an inner face from which a first tooth extends radially inward,
wherein the unrestrained gasket is a Rieber gasket.

18. The method of claim 17 including inserting a spigot of a second plastic pipe into the bell and through an opening of the restrained gasket.

19. The method of claim 18 including impinging the first tooth of the restraining segment of the restrained gasket against the spigot and a second tooth of the restraining segment against the front radial wall.

20. The method of claim 17 including forming the annular groove of the bell by extruding the first plastic pipe over a mandrel having the unrestrained gasket disposed thereon.

* * * * *